Patented Nov. 28, 1933

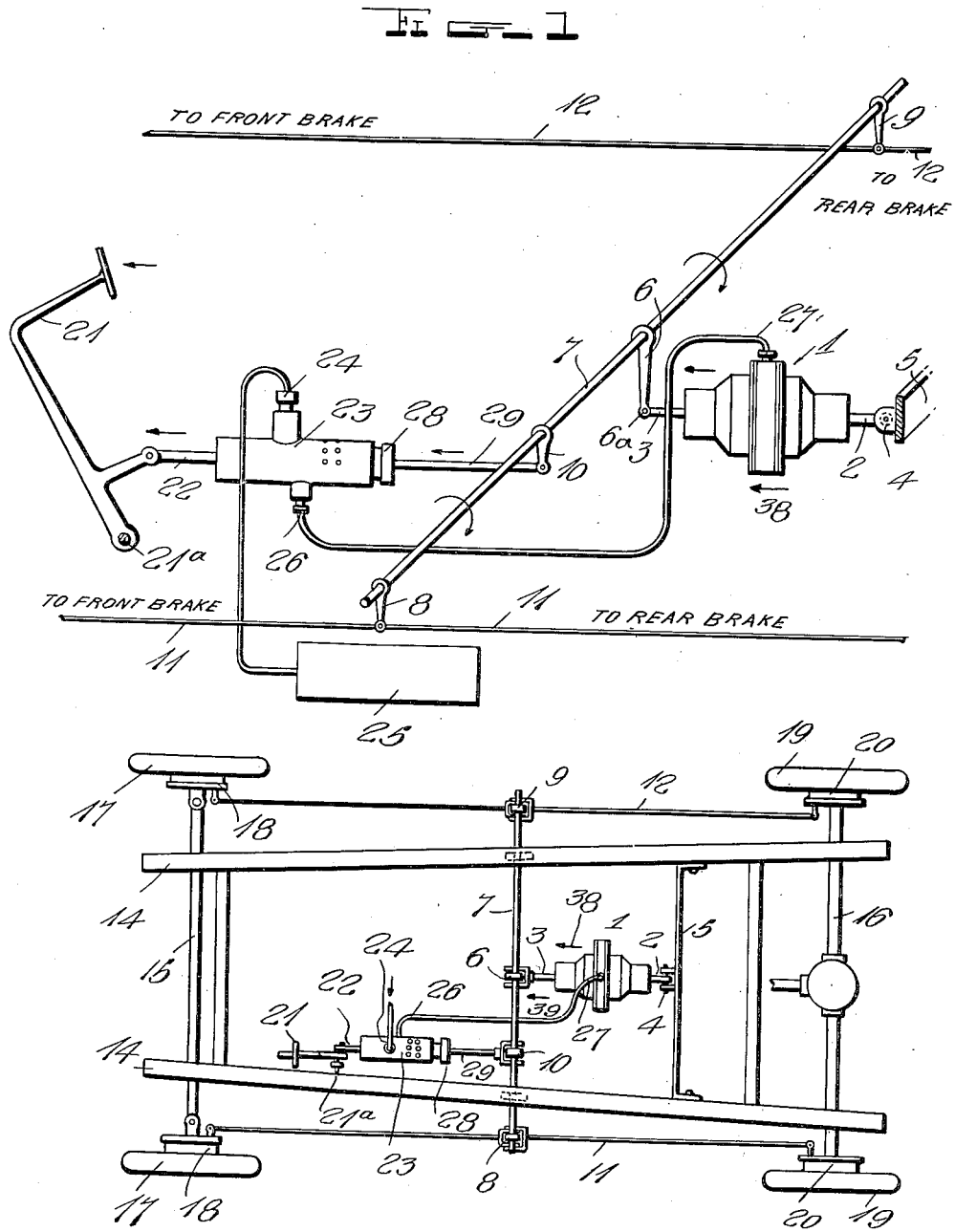

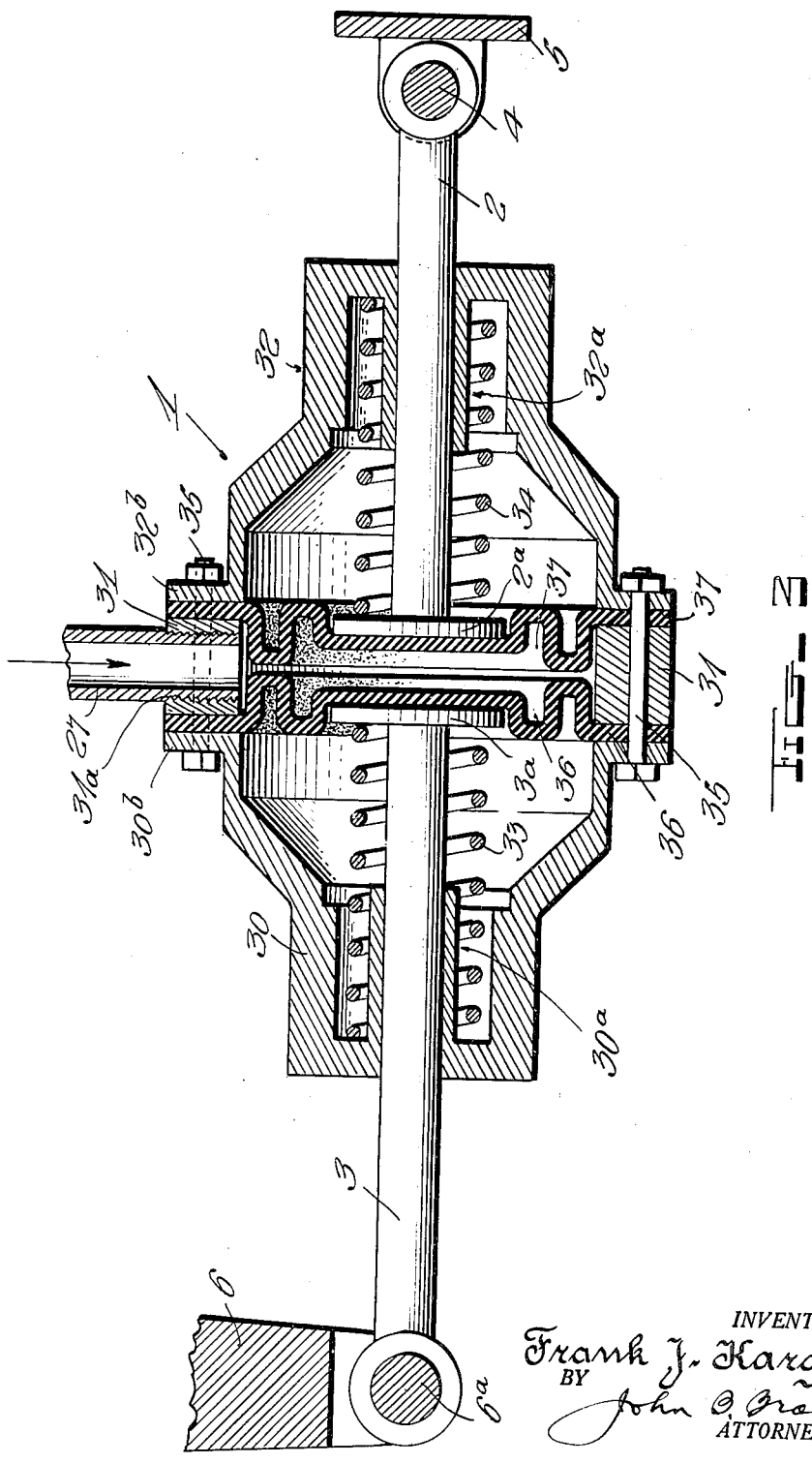

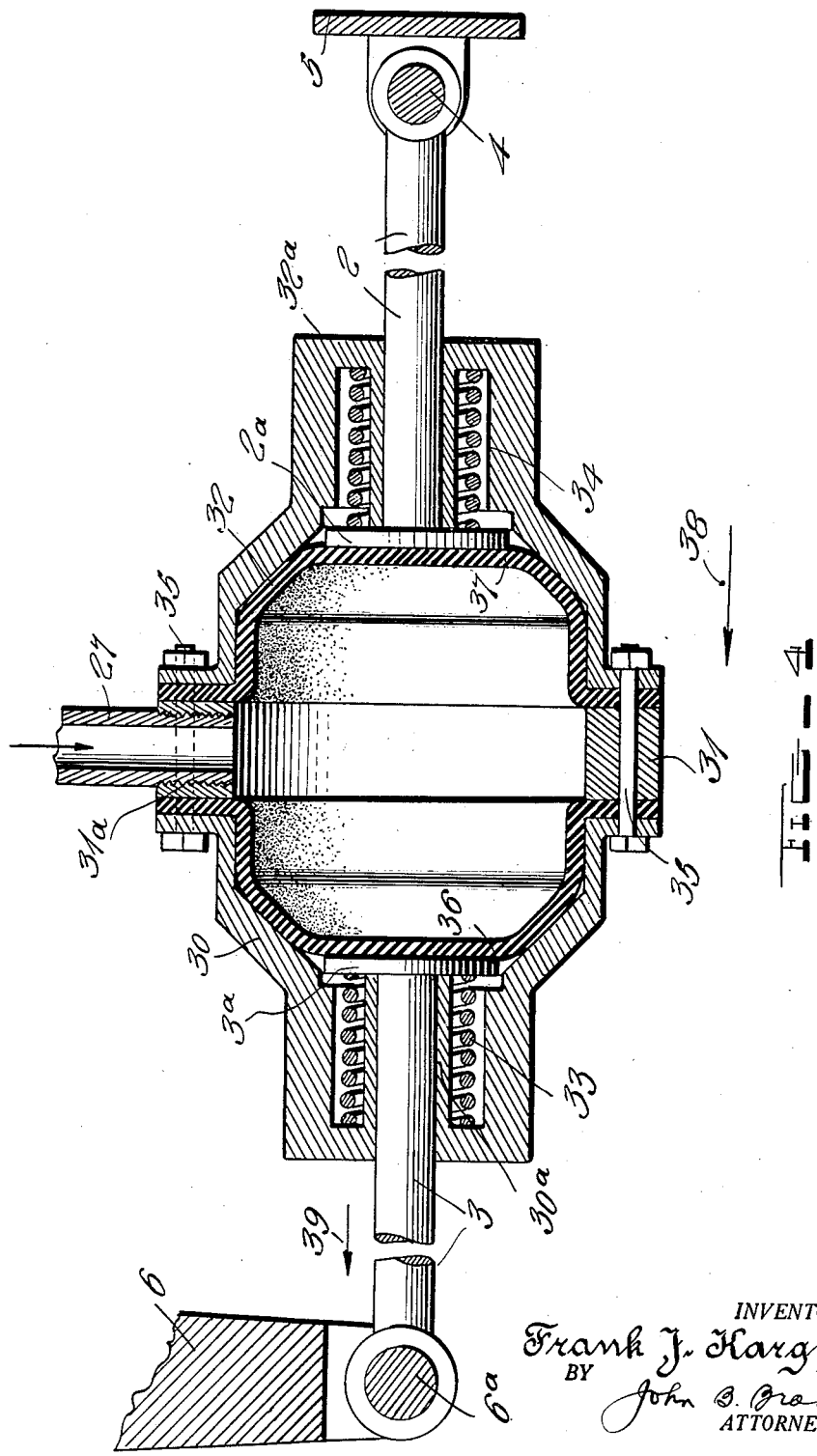

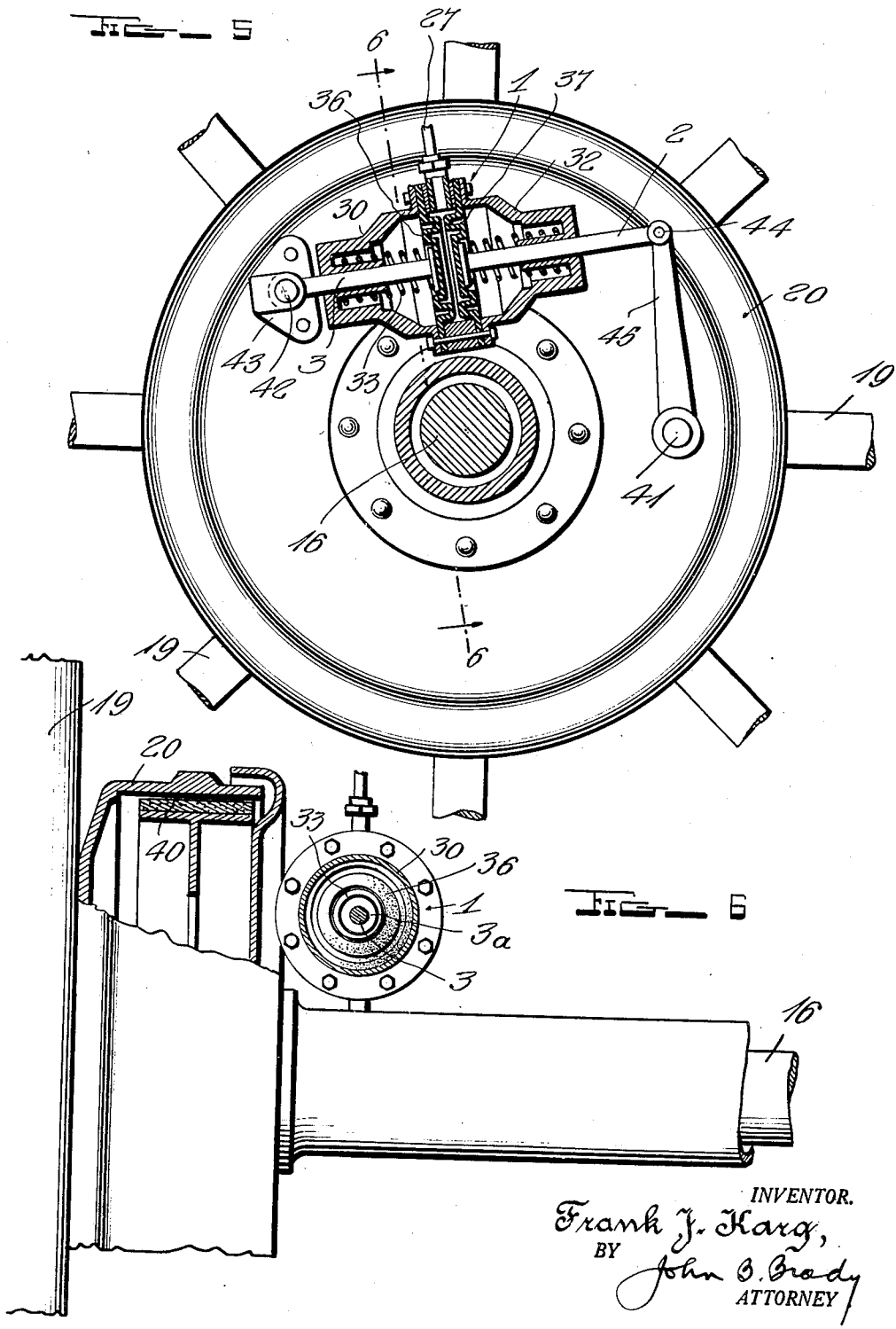

1,936,602

UNITED STATES PATENT OFFICE 1,936,602

BRAKE ACTUATOR

Frank J. Karg, Akron, Ohio

Application November 24, 1931
Serial No. 577,103

1 Claim. (Cl. 121—38)

My invention relates broadly to brake mechanisms and more particularly to a construction of fluid or air actuator for brake systems.

One of the objects of my invention is to provide a construction of fluid or air actuator for the brake bands of a brake drum in which balanced operation may be obtained by introducing the fluid or air supply in a chamber having opposite walls formed by resilient diaphragms spaced one from another and serving to operate a brake actuating mechanism and permit the brake to be applied in a gradual and smooth manner.

Another object of my invention is to provide a construction of fluid or air actuator for brakes in which the operating mechanism of the actuator is controlled by the movement of a pair of oppositely positioned resilient walls arranged to directly operate upon a spring pressed piston member in the rear of the resilient diaphragm and outside of the limits of the pressure chamber between the diaphragms.

A further object of my invention is to provide a fluid or air controlled actuator for a vehicle brake which may be applied either directly to a brake or connected with a lever forming part of the mechanism for actuating all of the brakes.

A still further object of my invention is to so construct and mount the actuator that while it will be compact and occupy a small space it will have sufficient length of movement to very effectively apply the brakes.

Another object of my invention is to provide a brake actuator including a cylinder casing having pistons slidable longitudinally therein wherein one piston is connected to a stationary support and the other to a brake applying lever and thereby permit the casing and second piston to have movement relative to the first piston and each other and very effectively apply brakes.

Another object of my invention is to so construct the casing that the pistons will be well supported and braced against transverse movement which would be liable to cause wear producing leaks.

Still another object of my invention is to so form inner ends of the pistons that the diaphragms may have very good pressing action against the same and so form the walls of the cylinder that outward movement of the pistons will be limited.

Still another object of my invention is to provide a stroke fluid or air actuating device for brake mechanism consisting of a bodily movable cylindrical structure constituted by a plurality of cylinders including an intermediate cylinder having its end walls closing resilient diaphragms displaceable in position under control of fluid or air pressure introduced therebetween with spring members projecting through the end cylinders and contacting with the exterior surfaces of the resilient diaphragms, one of the spring members being adapted to be connected to a vehicle frame member and the other of said to a vehicle frame member and the other of said spring members being connectible with a brake mechanism whereby for equal strokes of said spring members, a stroke of double length may be imparted to the associated brake mechanism.

Other and further objects of my invention will be understood from the specification hereinafter following by reference to the accompanying drawings, in which:

Figure 1 diagrammatically illustrates the arrangement of the automatic brake actuating device of my invention in a foot brake system for an automobile; Fig. 2 is a plan view showing the relative location of the foot brake, the valve control and the brake actuator as applied to a motor vehicle; Fig. 3 is a longitudinal cross-sectional view taken through the brake actuator of my invention with the brake mechanism in one applied position; Fig. 4 shows the brake actuator of my invention when the brake mechanism has been applied; Fig. 5 shows the application of the brake actuator of my invention to the brake drum of a vehicle; and Fig. 6 is a side elevational view showing the brake drum and driving axle, the brake drum being partially broken away and illustrated in section and illustrating the brake actuator of my invention in cross-section on line 6—6 of Fig. 5.

While the improved brake mechanism has been shown applied to an automobile it will be understood that this is only one practical application of the invention.

Referring to the drawings in detail, reference character 1 designates the brake actuator of my invention. The brake actuator is shown suspended for longitudinal displacement with respect to link members 2 and 3. Link member 2 is connected through pivoted joint 4 with the stationary support 5. The link 3 is pivotally connected through lever 6 with the angularly rockable cross-bar 7. The angularly rockable cross-bar 7 has lever arms 8, 9 and 10 extending therefrom. Lever arms 8 and 9 connect to the brake rods 11 and 12 which extend to the front brakes and to the rear brakes. The arrangement will be more clearly understood in Fig. 2 wherein the brake drums for each of the wheels of the motor vehicle have been illustrated.

The motor vehicle has been shown as having chassis 14 supported by front axle 15 and rear axle 16. The set of front wheels 17 have brake drums 18 which are controlled by the forward extensions of brake rods 11 and 12. The set of rear wheels 19 each have brake drums 20 which are controlled by the rearward extension of brake rods 11 and 12. The lever mechanism for each of the brake drums is so arranged that movement of levers 8 and 9 forward operates to apply the brakes, whereas movement of levers 8 and 9 rearwardly, results in releasing the brakes. It will be observed that the brake actuator 1 is freely suspended to apply movement to lever 6. The brake actuator, as will be more fully hereinafter described, is operated by air under pressure delivered through pipe line 27. The supply of air is obtained from pressure reservoir 25, the air being applied through inlet 24 to valve housing 23.

The structure of the valve housing 23 is described more fully in copending application Serial No. 577,141, filed November 24, 1931 by Leo Herman.

Brake pedal 21 of the vehicle is journaled at 21a and is adapted to be shifted in a forward direction by foot pressure applied against the foot pedal for forwardly shifting valve rod 22. The valve housing 23 is freely suspended so that when valve rod 22 has been shifted to its forward limiting position, valve housing 23 is bodily moved. The head 28 is carried in the end of valve housing 23 and is connected through link 29 with lever 10 which extends from cross rod 7. It will thus be seen that cross rod 7 and brakes which are connected therewith may be operated either by the brake actuator 1 or under emergency conditions directly by the foot pedal 21. The link 3 extending from the brake actuator 1 moves in the same direction as the direction of movement of rod 29 as pedal 21 is pressed forward by the foot. After the air control period has been expanded the foot brake system may be utilized by further pressure upon the brake pedal 21 which draws the cylinder 23 forward, thereby moving the head 28 and the rod 29 secured therein and connected to lever 10. The brake system is therefore operated first under air pressure and then if necessary under foot pressure.

In Fig. 3 the structure of the brake actuator of my invention has been shown more clearly as comprising casings 30 and 32 in the form of cup shaped members directed toward each other and each having inwardly directed sleeves 30a and 32a which serve to support and guide the links 2 and 3. The links 2 and 3 are in the form of reciprocatory rods, each of which have flanged heads 2a and 3a thereon against which the expansion spring members 33 and 34 exert a continuous pressure. Spring 33 is disposed between the under surface of flanged head 3a in the end of the casing 30 surrounding the sleeve 30a. The spring 34 exercises a continuous pressure against the under surface of flange 2a and against the end of the casing 32 surrounding the sleeve 32a. The casings 30 and 32 are interconnected by means of bolt members 35 which extend through flanges 30b and 32b and through the annular intermediate spacer 31 and the peripheries of the resilient diaphragms 36 and 37. The diaphragms 36 and 37 normally have the shape illustrated in Fig. 3 where the central portions thereof extend parallel to and engage the surfaces of the flanges 2a and 3a and have corrugated portions extending around the flanges 2a and 3a which permit expansion of the resilient diaphragms into the casings 30 and 32, when air is applied between the diaphragms. The annular intermediate member 31 is tapped at 31a to permit the entry of the supply pipe 27 into the chamber formed by the resilient diaphragms 36 and 37. As can be more clearly seen in Fig. 4, the effect of introducing air pressure in the chamber intermediate the diaphragms 36 and 37 is to force the diaphragms 36 and 37 into the chambers formed by the casings 30 and 32 thereby enabling the resilient diaphragms 36 and 37 to expand by stretching out the corrugated portions of the diaphragm to substantially conform with the interior shape of the casings 30 and 32. As shown in Fig. 4 diaphragms 36 and 37 expand under the action of air pressure introduced by means of pipe 27 and act against flanges 2a and 3a thereby longitudinally displacing links 2 and 3 against the pressure of springs 33 and 34 and displacing the entire casing formed by portions 30 and 32 in the direction indicated by arrow 38 and longitudinally shifting link 3 in the same direction as indicated by arrow 39 and imparting movement to lever 6 through connections 6a for rocking cross-bar 7 for correspondingly effecting an operation of the brakes. It will be observed that a stroke equal to a length double the length of the stroke of link 3 is obtained by suspending the casing members 30 and 32 free for longitudinal movement for the casings as a unit are displaced longitudinally for a distance equal to the stroke of link member 2 which has the same length of stroke as link member 3 which movement when added to the normal stroke of link member 3 gives a displacement double that of link member 3.

In the structure illustrated in Figs. 1, 2, 3 and 4, it is assumed that the brake actuator is suspended for longitudinal movement beneath the chassis of the vehicle for operation of all of the brake drums on the vehicle through a link gear.

In Figs. 5 and 6, I have illustrated the application of the brake actuator of my invention to the individual brake drums of a motor vehicle. I designated the axle at 16 arranged to drive the wheel 19. The brake drum has been illustrated at 20 containing the usual brake shoe 40 therein which shoe is adapted to be operated through the usual crank mechanism designated at 41. The brake actuator of my invention is designated at 1 as having a construction identical with the construction of brake actuator fully disclosed in Figs. 3 and 4. The end of link 3 however is pivotally connected at 42 to a bracket 43 supported on the brake anchor plate 20. The end of link 2 is pivotally connected at 44 with the end of lever 45 connecting to the crank 41 for actuating the brake mechanism within the brake drum 20. The air pressure is applied through pipe 27 thereby effecting an expansion of diaphragms 36 and 37 and a displacement thereof into the chambers formed by casings 30 and 32 thereby shifting link 23 and displacing the entire casing as a unit against the abutment formed by pivotal connection 42 with bracket 43 and effecting a displacement of lever 45 double that obtainable by the movement of link 2 alone. The suspension of the casings 30 and 32 is such that pipe 27 must have sufficient flexibility to permit a shift of the casings as a unit. For this purpose I utilize a flexible connection as part of the pipe line 27. Similarly in the arrangement shown in Figs. 1 and 2 the control valve 23 is free to shift and accordingly the connection from the reservoir 25 to the pressure inlet 24 is flexible. Similarly the connection from the outlet 26 to the brake actuator 1 is flexible at the point of discharge to allow displacement of the control valve structure.

Wherever in the application and claim the term "fluid operated" or "air operated" has been used I intend this expression to be understood broadly to include operation of the brake system by any kind of fluid medium such as air or liquid. I have used the terms in a broad sense and not in a limited sense.

I have found the construction of my invention highly practical for manufacture and production and while I have described one of the preferred embodiments of my invention, I desire that it be understood that modifications may be made and that no limitations upon my invention are intended other than are imposed by the scope of the appended claim.

What I claim as new and desire to secure by Letters Patent of the United States is as follows:

A fluid operated actuator for brakes comprising a cylindrical casing, diaphragms dividing said casing into an intermediate chamber and end chambers, plungers slidable longitudinally in said end chambers through opposite ends of said casing and engaging said diaphragms, one plunger having means at its outer end for connecting the same with a rigid support and the second plunger having its outer end adapted to be connected with a movable element forming part of a brake applying mechanism, an inlet being provided in the casing for admitting fluid under pressure into the intermediate chamber to act against the diaphragms and effect shifting of the casing and said second plunger longitudinally of the first plunger and also movement of the second plunger longitudinally of the casing relative thereto.

FRANK J. KARG.